(12) United States Patent
Adams

(10) Patent No.: US 11,721,159 B1
(45) Date of Patent: Aug. 8, 2023

(54) AUTONOMOUS AUGMENTED REALITY GAMING INTERACTION DEVICE

(71) Applicant: Karriem Adams, Milpitas, CA (US)

(72) Inventor: Karriem Adams, Milpitas, CA (US)

( * ) Notice: Subject to any disclaimer, the term of this patent is extended or adjusted under 35 U.S.C. 154(b) by 496 days.

(21) Appl. No.: 17/022,726

(22) Filed: Sep. 16, 2020

Related U.S. Application Data

(63) Continuation-in-part of application No. 16/850,448, filed on Apr. 16, 2020, now Pat. No. 11,151,831.

(51) Int. Cl.
| | | |
|---|---|---|
| *B25J 9/00* | (2006.01) | |
| *B25J 15/00* | (2006.01) | |
| *G07F 17/32* | (2006.01) | |
| *B25J 19/02* | (2006.01) | |
| *G05D 1/00* | (2006.01) | |
| *F24F 13/28* | (2006.01) | |
| *B25J 19/04* | (2006.01) | |
| *B25J 13/08* | (2006.01) | |
| *B25J 5/00* | (2006.01) | |
| *B25J 9/16* | (2006.01) | |

(52) U.S. Cl.
CPC .......... *G07F 17/3209* (2013.01); *B25J 5/007* (2013.01); *B25J 9/0003* (2013.01); *B25J 9/1664* (2013.01); *B25J 9/1689* (2013.01); *B25J 9/1697* (2013.01); *B25J 13/08* (2013.01); *B25J 15/00* (2013.01); *B25J 19/023* (2013.01); *B25J 19/04* (2013.01); *F24F 13/28* (2013.01); *G05D 1/0016* (2013.01); *G05D 1/0038* (2013.01); *G07F 17/3213* (2013.01); *G07F 17/3218* (2013.01); *G07F 17/3225* (2013.01)

(58) Field of Classification Search
CPC ...... B25J 9/0003; B25J 9/1664; B25J 9/1689; B25J 9/1697; B25J 19/023; G05D 1/0016; G05D 1/0038
See application file for complete search history.

(56) References Cited

U.S. PATENT DOCUMENTS

| | | | | |
|---|---|---|---|---|
| 2012/0238366 | A1* | 9/2012 | Tedder | A63F 3/00643 463/42 |
| 2013/0165194 | A1* | 6/2013 | Nojiri | A63F 13/426 463/5 |
| 2016/0310831 | A1* | 10/2016 | Chun | A63F 1/18 |
| 2018/0099211 | A1* | 4/2018 | Huang | A63F 1/14 |
| 2019/0156623 | A1* | 5/2019 | Thomas | G07F 17/3218 |

* cited by examiner

*Primary Examiner* — Kira Nguyen
(74) *Attorney, Agent, or Firm* — Gulf Coast Intellectual Property Group

(57) ABSTRACT

An autonomous augmented reality gaming interaction apparatus configured to provide a remote player an ability to participate in games disposed within a gaming facility from a remote location. The autonomous augmented reality gaming interaction apparatus includes a primary robotic member that is operable to traverse through the gaming facility. The primary robotic member includes a first gaming arm member and a second gaming arm member. The first gaming arm member and second gaming arm member being configured to provide an ability to physically engage with games. A game piece reading tray member is secured to the second gaming arm member and is configured to optically scan game piece images to be transferred to a remote control unit. An air quality module is further provided in the primary robotic member and is configured to provide filtration and contaminant detection of air.

11 Claims, 3 Drawing Sheets

AUTONOMOUS AUGMENTED REALITY GAMING INTERACTION DEVICE

CROSS REFERENCE TO RELATED APPLICATIONS

This non-provisional application is a continuation in part of U.S. patent application Ser. No. 16/850,448 filed, Apr. 16, 2020, entitled, Card Reader for Augmented Reality Game System, in the name of Karriem Adams, which is hereby incorporated for reference

FIELD OF THE INVENTION

The present invention relates generally to gaming systems and apparatus pertaining thereto, more specifically but not by way of limitation, a card reader for use in an augmented reality casino game system wherein the card reader is remotely engaged by a user participating in a casino table game.

BACKGROUND

In the United States the gambling industry is a multi-billion dollar per year industry. While some states have more open regulations than others, most states have at least some form of entertainment wherein it is permissible to bet with the provider or other individuals participating in the activity. Gambling activities include betting on events such as but not limited to horse racing. The most popular form of gambling are casinos and other similar facilities that offer games such as but not limited to cards, slot machines and many others. Gambling entities are destinations and are not provided in all states. These destination gambling entities have recently faced difficult times, more specifically in the wake of the 2020 COVID virus pandemic. The virus pandemic required temporary shutdown of the gambling entities facilities as well as other establishment such as but not limited to restaurants. In response to the pandemic, governing authorities have placed restrictions on parameters such as but not limited to building occupancy. For indoor establishments such as but not limited to gambling entities, there is a requirement to limit the number of people within the facility. Additionally, as these gambling entities attempt to conduct business within the aftermath of the pandemic, it is of utmost importance to maintain both patron and employee safety.

Most states allow some form of online gaming wherein a player can login to a website and play a game such as but not limited to poker and place bets. One of the problems with this is the lack of simulation of reality. Online poker games are typically software simulations of card games the use algorithms and a software interface to simulate a poker game. These can be financially risky and further do not provide a true poker game experience. The online gaming industry includes the ability to virtually place bets on games and events but does not provide simulation and an interaction synonymous with attending a facility operated by a gambling entity. As technology has evolved, the ability for a gambling entity to provide a more realistic experience is possible. Additionally, existing gambling entities must utilize their excess capacity of gaming tables and devices as requirements of limitations of patrons has left most facilities with excess capacity. Augmented reality is an interactive experience of a real world environment. In order to provide an augmented reality experience, devices need to be deployed within the facilities owned and operated by gambling entities.

Accordingly, there is a need for an augmented reality device that is configured to be autonomously disposed within a gambling facility wherein the augmented reality device is accessible and controllable by a remote player so as to facilitate the ability for the remote player to play all of the games within the gambling facility.

SUMMARY OF THE INVENTION

It is the object of the present invention to provide an autonomous gaming interaction apparatus that is configured to provide an ability for a remote player to interact with and participate in games available in a gambling facility wherein the preferred embodiment of the present invention includes a primary robotic member.

Another object of the present invention is to provide a remote operated apparatus that is configured to provide an augmented reality experience when participating in the playing of casino games wherein the primary robotic member is movable throughout the gambling facility.

A further object of the present invention is to provide an autonomous gaming interaction apparatus that is configured to provide an ability for a remote player to interact with and participate in games available in a gambling facility wherein the primary robotic member is controllable via a remote control unit operated and in the possession of a remote user.

Yet a further object of the present invention is to provide a remote operated apparatus that is configured to provide an augmented reality experience when participating in the playing of casino games wherein the primary robotic member includes a first gaming arm member.

Still another object of the present invention is to provide an autonomous gaming interaction apparatus that is configured to provide an ability for a remote player to interact with and participate in games available in a gambling facility wherein the primary robotic member includes a second gaming arm member.

An additional object of the present invention is to provide a remote operated apparatus that is configured to provide an augmented reality experience when participating in the playing of casino games wherein the primary robotic member includes an upper portion having at least one camera, a bio-filter intake port and wherein the upper portion is movable in an upwards-downwards direction.

Yet a further object of the present invention is to provide an autonomous gaming interaction apparatus that is configured to provide an ability for a remote player to interact with and participate in games available in a gambling facility wherein the primary robotic member utilizes artificial intelligence and machine learning to identify and understand its location within the facility and what type of game to which it is proximate.

Another object of the present invention is to provide a remote operated apparatus that is configured to provide an augmented reality experience when participating in the playing of casino games that further includes a plurality of proximity sensors configured to assist in collision avoidance.

Still a further object of the present invention is to provide an autonomous gaming interaction apparatus that is configured to provide an ability for a remote player to interact with and participate in games available in a gambling facility wherein the present invention is configured to provide air filtration and air quality monitoring.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
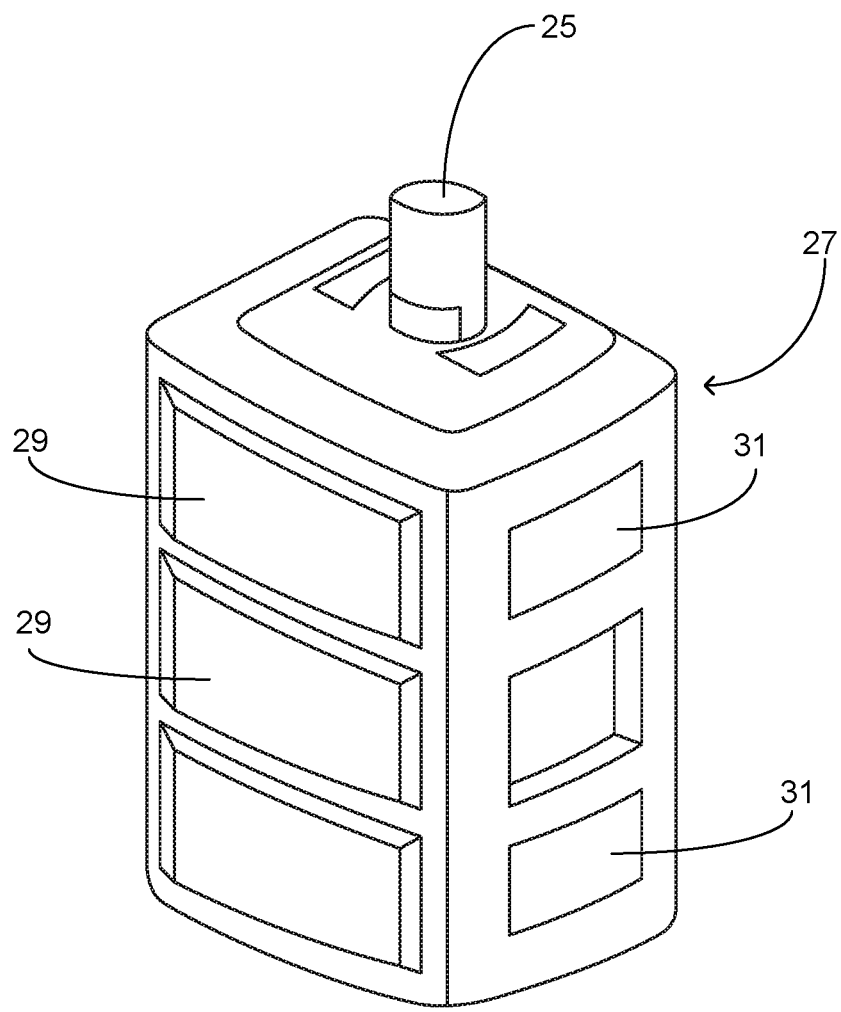
FIG. 1 is a perspective view of a bio-filter and air monitoring element of the present invention.
Figure 2:
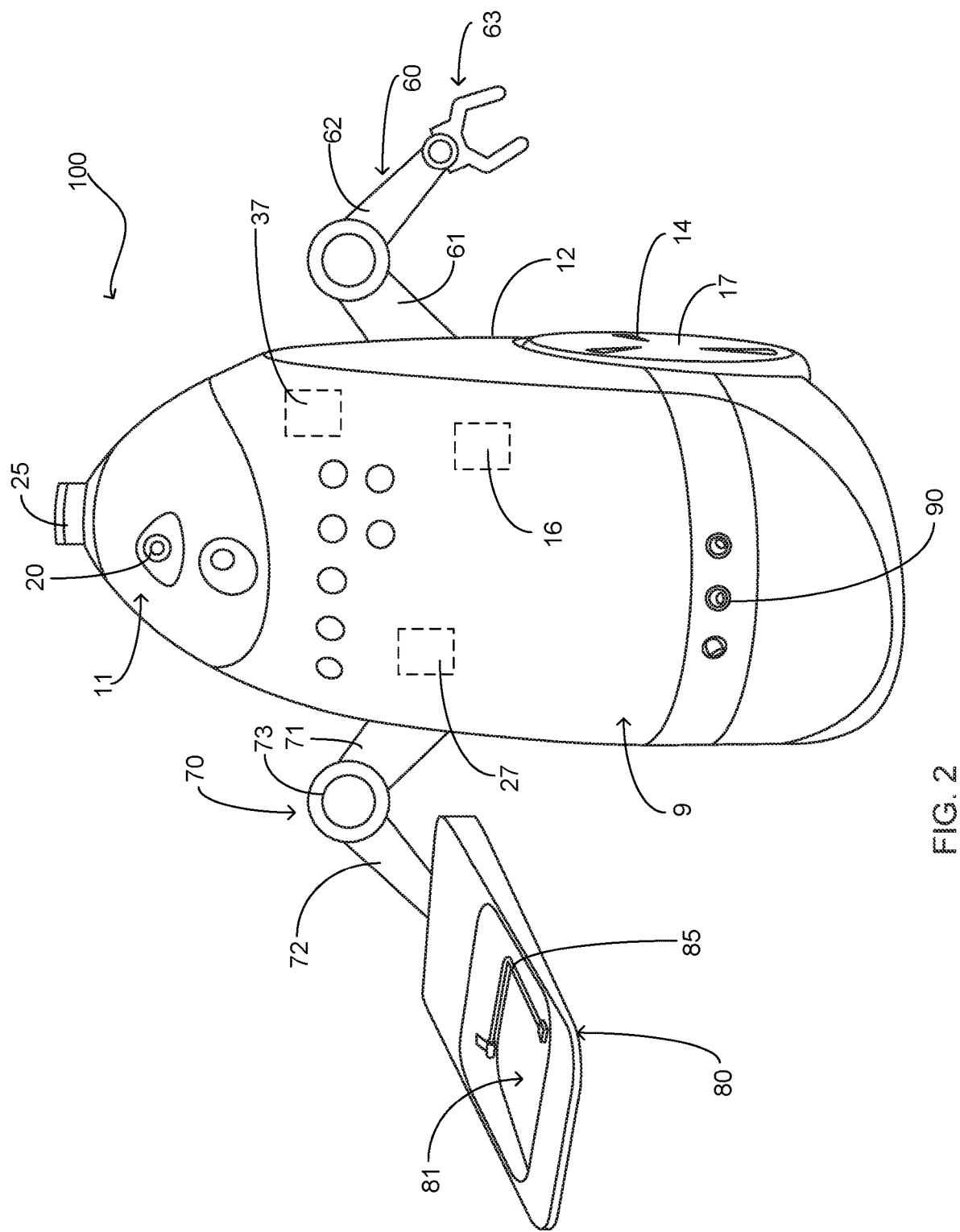
FIG. 2 is a perspective view of the primary robotic member of the present invention.

Referring now to the drawings submitted herewith, wherein various elements depicted therein are not necessarily drawn to scale and wherein through the views and figures like elements are referenced with identical reference numerals, there is illustrated an autonomous augmented reality gaming interaction apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the autonomous augmented reality gaming interaction apparatus 100 includes a primary robotic member 10. The primary robotic member 10 includes a housing 12, drive assembly 14 and central processing unit 16 wherein the primary robotic member 10 is configured to traverse throughout a gambling entity's facility wherein the autonomous augmented reality gaming interaction apparatus 100 is being controlled by the remote control unit 50 that is in the possession of a remote individual as is further described herein. The central processing unit 16 includes the necessary electronics configured to store, receive, transmit and manipulate data. The central processing unit 16 is communicably coupled to a wireless network disposed within a gambling entity facility and uses protocols such as but not limited to TCIP to communicate with the remote control unit 50. The drive assembly 14 of the primary robotic member 10 is configured to facilitate the traversal of the primary robotic member 10 throughout a facility. It should be understood within the scope of the present invention that the drive assembly 14 could have alternate configurations so as to provide the desired functionality. The housing 12 is manufactured from a durable material such as but not limited to plastic and includes a lower portion 9 and an upper portion 11. The upper portion 11 is movably attached to the lower portion 9 utilizing suitable durable techniques. The upper portion 11 is movable in an upwards-downwards direction so as to accommodate alternate heights for providing proper view perspectives for various casino games to which the autonomous augmented reality gaming interaction apparatus 100 is adjacent.

The upper portion 11 includes a camera 20. The camera 20 is movably mounted within the upper portion 11 of the body 10 and is controllable via the remote control unit 50. The camera 20 is a conventional camera configured to provide a streaming video view for an individual that is operably engaged with the remote control unit 50. While one camera 50 is illustrated herein, it is contemplated within the scope of the present invention that the primary robotic member 10 could include a plurality of cameras configured to provide alternate views either simultaneously or separately. The upper portion 11 is illustrated herein in its first position wherein the upper portion 11 is adjacent the lower portion 9. In its second position the upper portion 11 is extended upward from the lower portion 9. It should be understood within the scope of the present invention that the upper portion 11 is movable via conventional motorized techniques.

Located at the top of the upper portion 12 is the intake port 25 for the air quality module 27. The air quality module 27 is disposed within the housing 12 of the primary robotic member 10 and is configured to provide both air filtration and air monitoring. The air quality module 27 intakes a large volume of air continuously via the intake port 25 and provides filtration thereof. While not particularly illustrated herein, it should be understood within the scope of the present invention that the air quality module 27 includes a plurality of HEPA filters 29 or the like in order to ensure removal of contaminants such as but not limited to allergens, bacteria and viruses present in the air. Furthermore, the air quality module 27 provides air quality monitoring utilizing a plurality of electrochemical sensors 31 that are configured to provide detection of airborne contaminants. The air quality module 27 is operably coupled to the central processing unit 16 wherein data collected from the air quality module 27 is transmitted to the central processing unit 16 for evaluation and transmission thereof to a remote computing device. While the intake port 25 of the air quality module 27 is illustrated herein as being proximate the top of the upper portion 11, it should be understood within the scope of the present invention that the intake port 25 could be located in alternate locations and still achieve the desired objective.

The central processing unit 16 includes the necessary electronics to receive, store, manipulate and transmit data. The central processing unit 16 is communicably coupled via conventional wireless communication protocols. This provides the ability to transfer data from the air quality module 27 as well as provide an operable communicable connection with the remote control unit 50 in order to provide operation thereof. The central processing unit 16 further provides the necessary computing algorithms to execute the artificial intelligence and machine learning of the autonomous augmented reality gaming interaction apparatus 100. The autonomous augmented reality gaming interaction apparatus 100 is capable of navigating a gambling facility without collision and is further operable to identify and recognize the alternate types of casino games such as but not limited to poker, slot machines and dice game tables. The aforementioned is achieved utilizing data from the camera 20 and programmed layout data stored within the central processing unit 16. This data allows a remote player operably engaged with the autonomous augmented reality gaming interaction apparatus 100 via the remote control unit 50 to proceed to a specified gaming table at the command of the remote player.

The autonomous augmented reality gaming interaction apparatus 100 includes a first gaming arm member 60. The first gaming arm member 60 is movably coupled to the housing 12 and is configured to facilitate engagement with particular types of casino games by a remote player. The first gaming arm member 60 includes a first section 61 and a second section 62 wherein the first section 61 and second section 62 are movably with respect to each other in both a rotatable and a pivotal motion. The first gaming arm member 60 includes grasp member 63 wherein the grasp member 63 is rotatably and pivotally coupled to the second section 62. The grasp member 63 is configured to enable a remote player to engage casino game elements such as but not limited to an arm of a slot machine and operate via the remote control unit 50. It should be understood within the scope of the present invention that the grasp member 63 could be provided in alternate shapes, sizes and incorporate various elements in order to achieve the desired objective discussed herein.

The autonomous augmented reality gaming interaction apparatus 100 includes a second gaming arm member 70. The second gaming arm member 70 is located on the opposite side of the housing 12 from the first gaming arm member 60. The second gaming arm member 70 includes a first section 71 movably coupled to a second section 72 with union 73. It should be understood within the scope of the present invention that the second section 72 of the arm is movable in a rotatable and a pivotal manner with respect to the first section 71. It should be further understood within the scope of the present invention that the first gaming arm member 60 and second gaming arm member 70 could be provided in alternate sizes and locations. The second gaming arm member 70 has operably secured thereto a game piece reading tray member 80. The game piece reading tray member 80 is movably coupled to the second section 72 of the second gaming arm member 70. More specifically but not by way of limitation, the game piece reading tray member 80 is rotatable so as to orient the upper surface 81 in an upwards or downwards facing orientation. The game piece reading tray member 80 is an optical reader that is configured to scan the surface of a game piece that has been placed on the upper surface 81 wherein subsequent scanning the central processing unit 16 will transmit the scanned image data to the remote control unit 50.

The game piece reading tray member 80 has operably coupled to the upper surface 81 a retention arm member 85. The retention arm member 85 is manufactured from a rigid material such as but not limited to plastic or metal. The retention arm member 85 is biasly mounted against the upper surface 81 utilizing a spring clip or other suitable fastener and is operable to receive a game piece so as to retain the game piece against the upper surface 81 in position so as to be optically scanned.

The autonomous augmented reality gaming interaction apparatus 100 further includes a plurality of proximity sensors 90. The proximity sensors 90 are operably coupled to the central processing unit 16 and are operable to provide object detection for the autonomous augmented reality gaming interaction apparatus 100 during traversal through a facility. It should be understood within the scope of the present invention that alternate types of proximity sensor technology could be employed such as but not limited to capacitive proximity sensors or photoelectric sensors. Furthermore, while only illustrated in a front location of the housing 12, it should be understood within the scope of the present invention that the proximity sensors 90 can be disposed completely around the housing 12 and further various quantities thereof can be employed.

Figure 3:
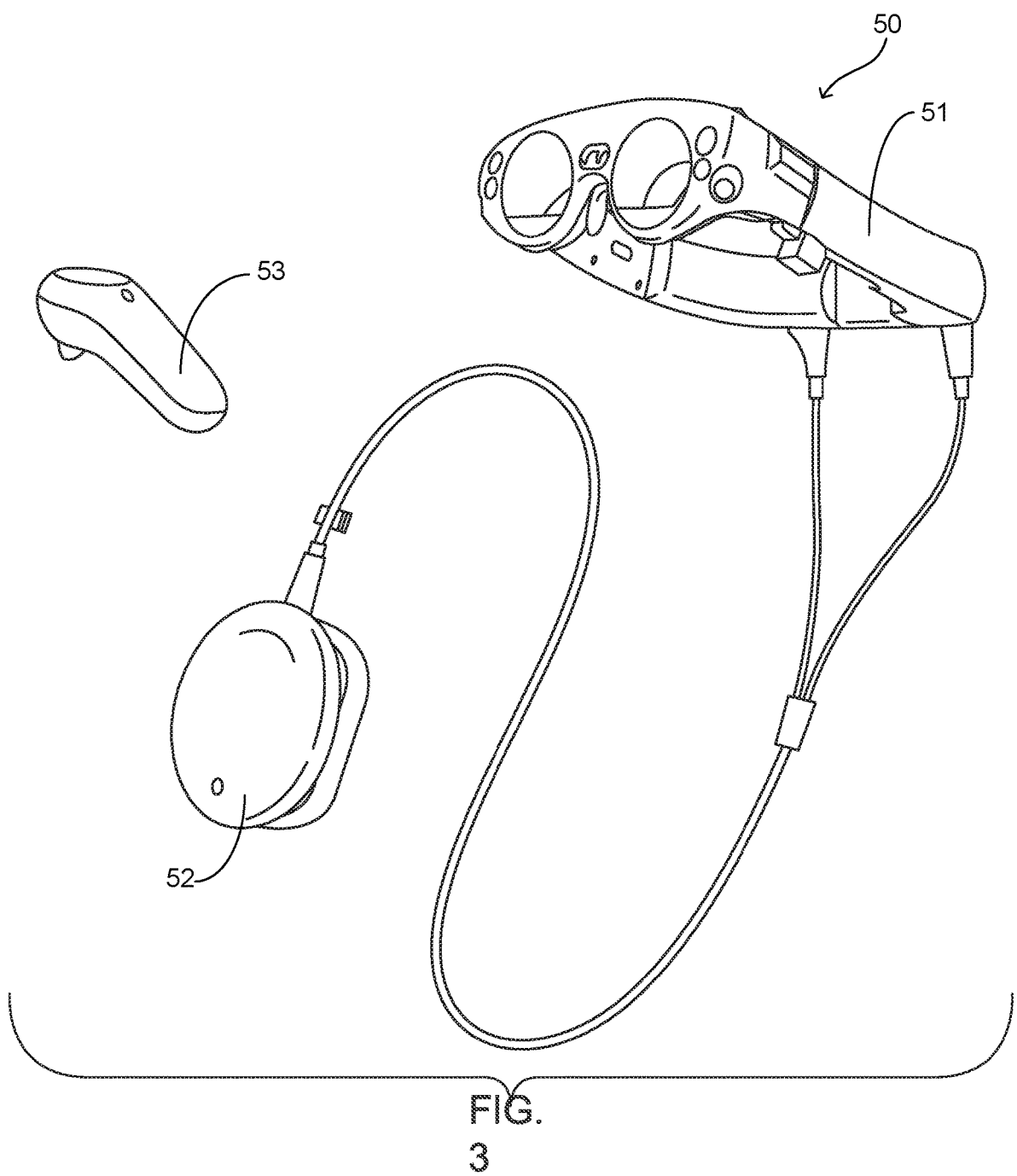
FIG. 3 is a perspective view of the remote control unit of the present invention.

Referring now in particular to FIG. 3, the autonomous augmented reality gaming interaction apparatus 100 includes a remote control unit 50. The remote control unit 50 is communicably coupled to the primary robotic member 10 utilizing conventional internet and wireless communication protocols. The remote control unit 50 includes a headset 51, first control member 52 and second control member 53. The headset 51 is configured to receive visual and audio data transmitted from the central processing unit 16. The first control member 52 and second control member 53 are configured to provide a remote user of the primary robotic member 10 complete control thereof. It should be understood within the scope of the present invention that the first control member 52 and second control member 53 can execute operable functions such as but not limited to control movements of the first gaming arm member 60 and second gaming arm member 70, control navigational movement of the primary robotic member 10 and execute operational control of the upper portion 11. It should be understood within the scope of the present invention that the remote control unit 50 could be physically embodied in alternate forms and still achieve the desired objective of providing an operational interface with the primary robotic member 10.

An audio module 37 is disposed within the housing 12 and includes conventional audio elements such as but not limited to a microphone and a speaker in order to receive and transmit audio data to the remote control unit 50.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An augmented reality gaming interaction apparatus operably disposed within a gaming facility being configured to provide a remote player an ability to engage games within the gaming facility wherein the augmented reality gaming interaction apparatus comprises:
   a primary robotic member, said primary robotic member having a central processing unit, sand central processing unit configured to receive, store, transmit and manipulate data, said primary robotic member having a housing, said primary robotic member configured to movably traverse through the gaming facility;
   at least one camera, said at least one camera being mounted to said primary robotic member, said at least one camera configured to provide visual data to the remote player;
   at least one gaming arm member, said at least one gaming arm member being movably secured to said housing, said at least one gaming arm member configured to operably engage a plurality of games within the gaming facility;
   a game piece reading tray member, said game piece reading tray member configured to optically scan game piece images so as to be transferred to the remote player, said game piece reading tray member operably coupled to the at least one gaming arm; and
   a remote control unit, said remote control unit being communicably coupled to the primary robotic member, said remote control unit configured to be utilized by the remote player so as to participate in the plurality of games within the gaming facility.

2. The augmented reality gaming interaction apparatus as recited in claim 1, and further including an audio module, said audio module configured to receive and emit sound data, said audio module being operably coupled to said central processing unit.

3. The augmented reality gaming interaction apparatus as recited in claim 2, and further including an air quality module, said air quality module being disposed within said housing, said air quality module having an intake port, said air quality module operable to receive and filter air proximate the primary robotic member.

4. The augmented reality gaming interaction apparatus as recited in claim 3, wherein said housing includes a lower portion and an upper portion, said upper portion being movable with respect to said lower portion.

5. The augmented reality gaming interaction apparatus as recited in claim 4, and further including a plurality of proximity sensors, said proximity sensors configured to provide object detection proximate said primary robotic member.

6. An autonomous augmented reality gaming interaction apparatus operably disposed within a gaming facility being configured to provide a remote player an ability to engage games within the gaming facility wherein the autonomous augmented reality gaming interaction apparatus comprises:
   a primary robotic member, said primary robotic member having a central processing unit, sand central processing unit configured to receive, store, transmit and manipulate data, said primary robotic member having a housing, said housing having an upper portion and a lower portion, said primary robotic member having a drive assembly configured to movably traverse the primary robotic member through the gaming facility;
   a first gaming arm member, said first gaming arm member being movably coupled to said primary robotic member, said first gaming arm member having a first section and a second section, said first gaming arm member having a grasp member secured to said second section, said grasp member configured to operably couple to elements the games within the gaming facility;
   a second gaming arm member, said second gaming arm member being operably coupled to said primary robotic member, said second gaming arm member having a first section and a second section, said second gaming arm member having a game piece reading tray member, said game piece reading tray member configured to obtain optical data of game pieces superposed onto an upper surface thereof;
   at least one camera, said at least one camera being mounted to said primary robotic member in particular the upper portion thereof, said at least one camera configured to provide visual data to the remote player; and
   a remote control unit, said remote control unit being communicably coupled to the primary robotic member, said remote control unit configured to be utilized by the remote player so as to participate in the plurality of games within the gaming facility.

7. The autonomous augmented reality gaming interaction apparatus as recited in claim 6, and further including an air quality module, said air quality module being disposed within said housing, said air quality module having an intake port, said air quality module operable to receive and filter air proximate the primary robotic member, said air quality module further configured to provide monitoring of air quality and transmit data thereabout to said central processing unit.

8. The autonomous augmented reality gaming interaction apparatus as recited in claim 7, wherein said game piece reading tray member further includes a retention arm, said retention arm operably coupled to the upper surface of the game piece reading tray member, said retention arm configured to bias game pieces against the upper surface.

9. The autonomous augmented reality gaming interaction apparatus as recited in claim 8, wherein said remote control unit includes a headset, said head set configured to display video and audio data to the remote player.

10. The autonomous augmented reality gaming interaction apparatus as recited in claim 9, and further including a plurality of proximity sensors, said proximity sensors configured to provide object detection proximate said primary robotic member.

11. The autonomous augmented reality gaming interaction apparatus as recited in claim 10, wherein said remote control unit includes at least one control member, said control member configured to provide operational control of the primary robotic member.

\* \* \* \* \*